No. 793,062. PATENTED JUNE 27, 1905.
H. DUKE.
DUST SEPARATING APPARATUS.
APPLICATION FILED JULY 26, 1904.

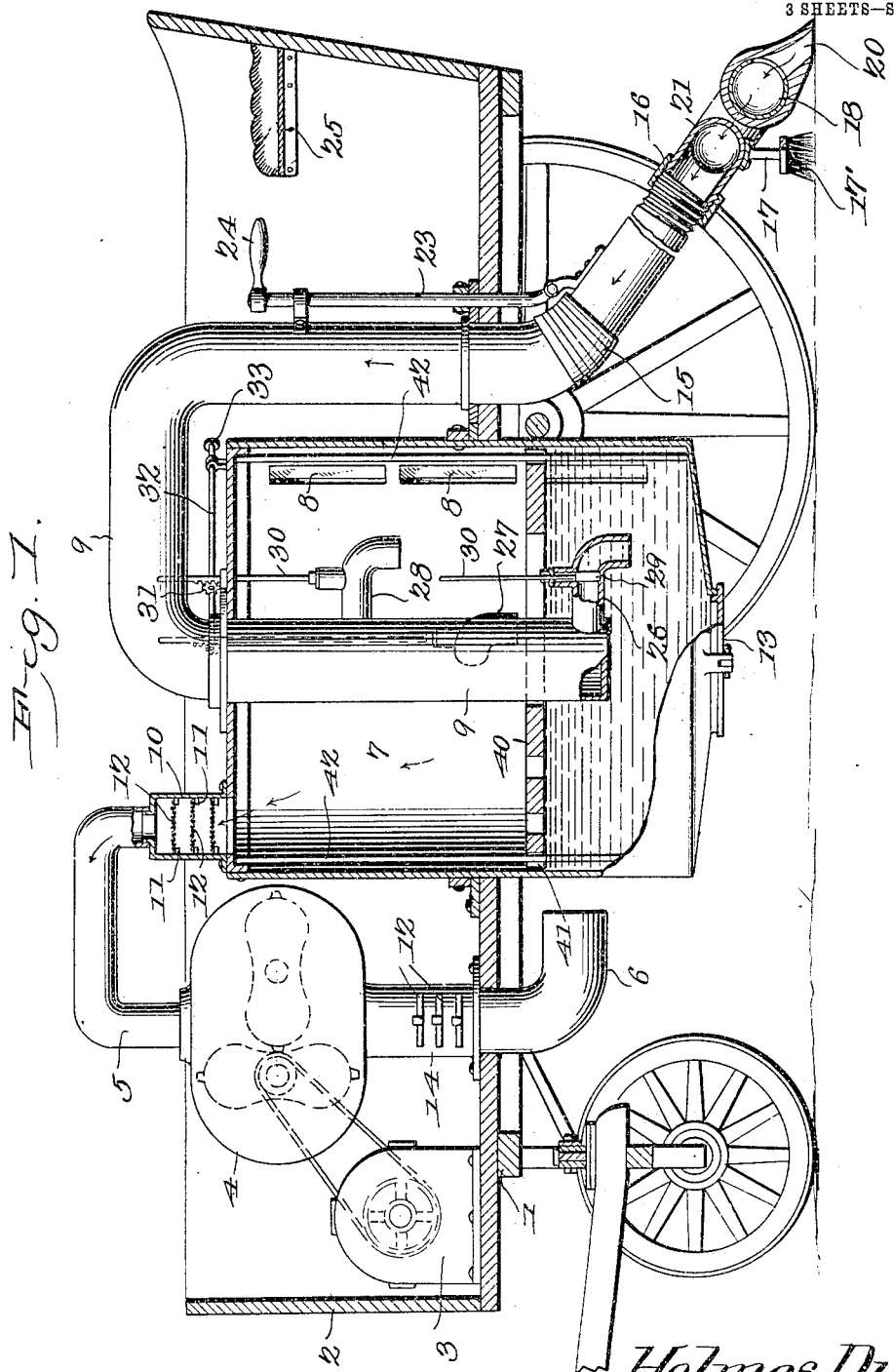

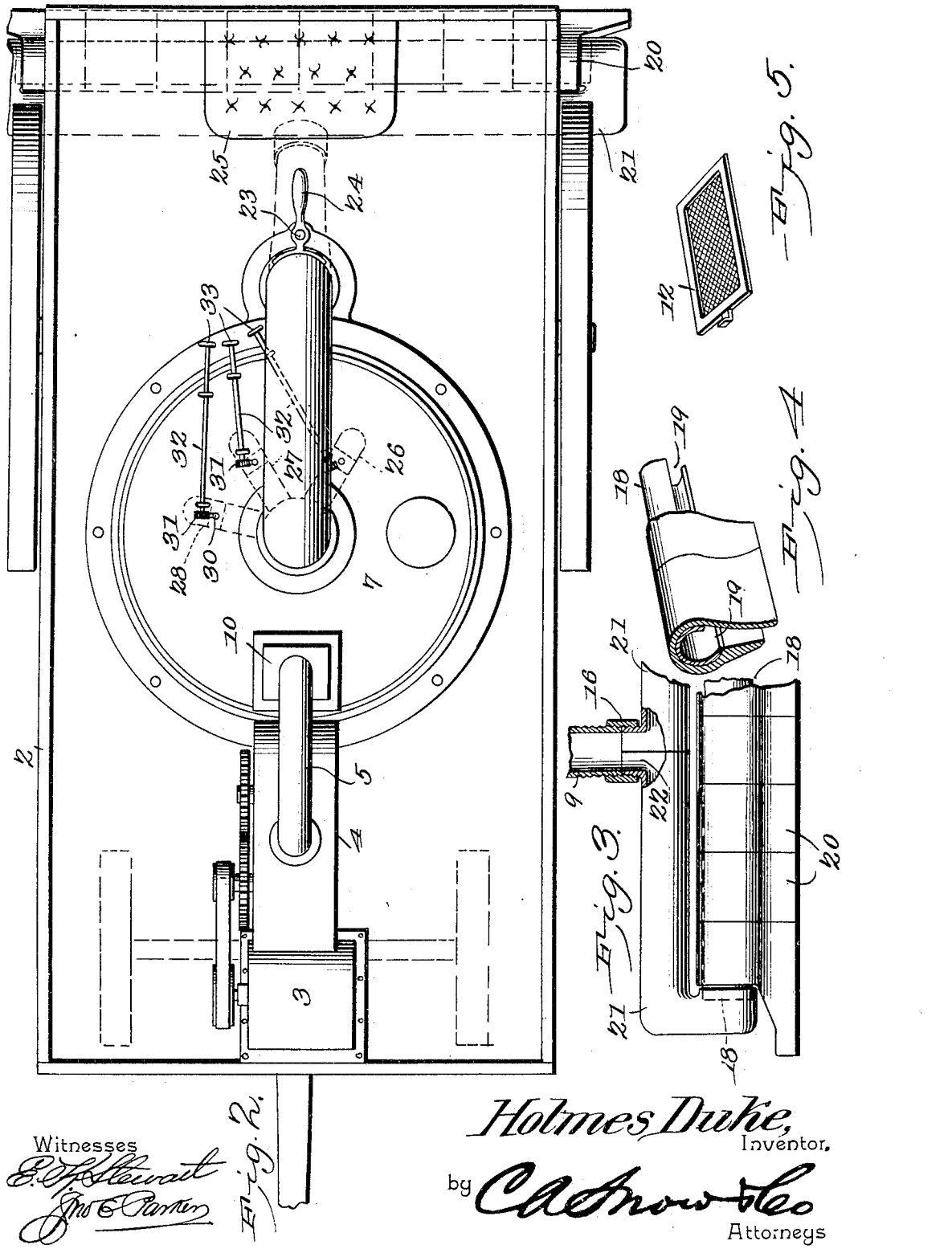

3 SHEETS—SHEET 3.

Holmes Duke,
Inventor,
by C. A. Snow & Co.
Attorneys

Witnesses

No. 793,062.

Patented June 27, 1905.

UNITED STATES PATENT OFFICE.

HOLMES DUKE, OF BEAUMONT, TEXAS.

DUST-SEPARATING APPARATUS.

SPECIFICATION forming part of Letters Patent No. 793,062, dated June 27, 1905.

Application filed July 26, 1904. Serial No. 218,258.

*To all whom it may concern:*

Be it known that I, HOLMES DUKE, a citizen of the United States, residing at Beaumont, in the county of Jefferson and State of Texas, have invented a new and useful Dust-Separating Apparatus, of which the following is a specification.

This invention relates to improvements in devices of that class employed for separating dust from air, and has for its principal object to provide a novel dust-separating means in which the dust-laden air is discharged at a point below the level of a body of water or other liquid, the vertical height of the point of discharge gradually increasing as the volume of dust increases, so that very large quantities of dust may be gathered at one operation, and by all of the dust being discharged below the water-level there will be no danger of clogging due to the sealing of the mouth of the discharge-pipe by the accumulated dirt.

A further object of the invention is to provide a device of this character in which a perforated float surrounds the air and dust pipe, the float being gradually raised as the quantity of dirt accumulates.

A still further object of the invention is to provide a novel form of screening device for preventing the passage of any dust to the suction-fan or air-pump, said screening device being so arranged that it may be readily opened and closed for the purpose of changing the screens.

With these and other objects in view, as will more fully hereinafter appear, the invention consists of the novel construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 6:
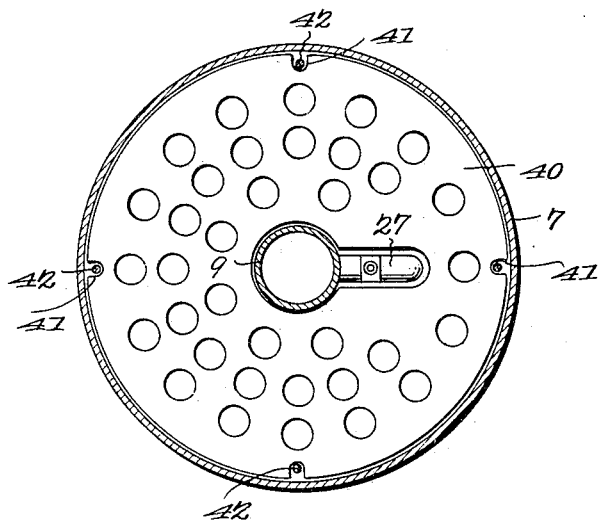
Figure 7:
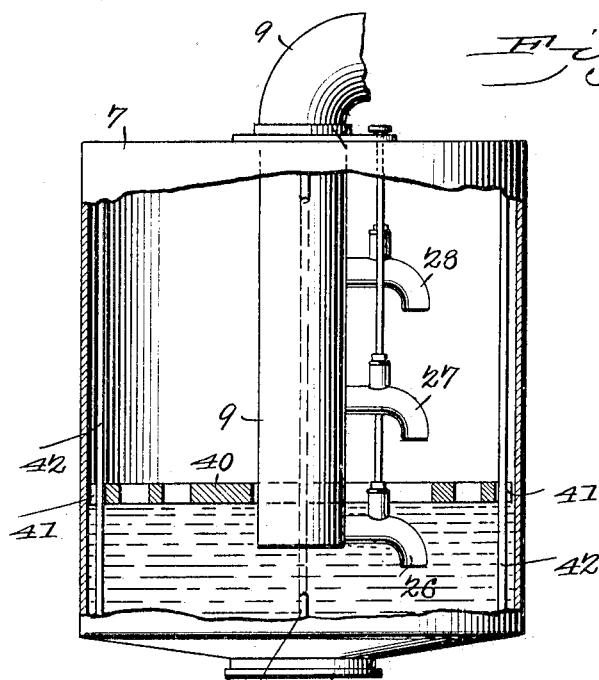

In the accompanying drawings, Figure 1 is a longitudinal sectional elevation of a street-cleaning device constructed in accordance with the invention. Fig. 2 is a plan view of the same. Fig. 3 is a rear elevation of a portion of the suction inlet member, portions being broken away in order to more clearly illustrate the construction. Fig. 4 is a detail perspective view of a portion of the suction inlet member. Fig. 5 is a detail perspective view of one of the screens. Fig. 6 is a sectional plan view of a dirt-receiving tank, illustrating a slightly-modified construction. Fig. 7 is a sectional elevation of the tank shown in Fig. 6.

Similar numerals of reference are employed to indicate corresponding parts throughout the several figures of the drawings.

While the device forming the subject of the present invention is applicable to separating devices for any purpose, the preferred embodiment is that illustrated in the accompanying drawings, wherein the apparatus is shown as forming part of a street-sweeper.

The working parts of the apparatus are mounted on a suitable wheeled platform 1, which may be of any desired construction, arranged to be drawn by animal power or propelled by a motor or other suitable device carried by the vehicle. On this platform is a suitable frame 2, carrying a motor 3, preferably a gas-engine, and said motor is connected to a suction-pump 4, having an inlet-pipe 5 and a discharge-pipe 6. On the platform is also arranged a tank 7, at one side of which are a number of glass panels 8, through which the contents of the tank may be observed in order that the operator may be informed when the tank is filled, and leading to said tank is the upper end of a suction-pipe 9, through which the dust and dirt laden air is conveyed to the tank, the discharge being below the level of a volume of water contained within the tank. The suction-pipe 5 of the pump is connected to the upper end of a box or casing 10, disposed at the top of the tank, and in said box or casing is arranged a plurality of horizontal ribs 11 for the reception of suitable filtering-screens 12, preferably formed of wire-gauze, and through which the air from the main receiving-tank passes before it reaches the pump. In the operation of this portion of the mechanism the under sides of the screens become clogged with dirt, and to effect their ready cleansing one end of the box 10 is provided with a hinged cover 13, which may be opened to permit the removal of the screens, and the latter are then placed within a suitable box 14, arranged at the lower end of the discharge-pipe 6, so that the blast of air passing downward through the pipe 6 may blow the dust and dirt from the screens, after which the latter may be removed to their original positions within the box 10.

The suction-pipe 9 is provided with a flexible joint 15 and at its extreme lower end is threaded for the reception of a coupling-sleeve 16, to which is connected the suction inlet-tube. To the under side of the main suction-tube is connected a frame 17, carrying a brush 17', which rests on the ground, and the bristles of the brush are arranged in diagonal rows and slightly spaced, so that the dirt will be left in parallel rows throughout the length of the brush.

The suction device proper consists of a cylindrical suction inlet-tube 18, provided throughout its entire length with a longitudinal slit 19 or with a plurality of openings, and on this tube is pivoted a number of inlet-nozzles 20, each of which is movable circumferentially of the tube and the movement of each is independent of the others, so that the lips of the nozzles may follow an uneven path or roadway and thus suck up the dirt from hollow portions of the pavement. The nozzle members 20 are of any desired width, and the passages formed therein are generally a trifle less in width than the width of the slit 19, so that in all positions assumed by the nozzle members there will be an unobstructed passage for the dirt to the interior of the suction inlet-tube.

The opposite ends of the inlet-tube 18 extend into the end portions of two intermediate tube-sections 21, the ends of the latter bearing against the end nozzle members and serving to hold said members in proper position longitudinally of the tube 18. The intermediate tubes 21 are curved, and these extend in a direction parallel with the suction inlet-tube 18 to a meeting-point about midway of the length of the tube 18. The sections 20 terminate each in a semicylindrical coupling member 22, that is externally threaded for the reception of the threaded collar 16, so that when the latter is screwed down on the end of the main suction-pipe the two parts of the tube 21 will be firmly united and all of the parts of the suction member will be held together. Should there be any derangement of the parts, it is merely necessary to turn the sleeve until it is free from the coupling members 22, after which all of the parts may be readily detached and examined and repaired, if necessary.

To the lower portion of the main suction-tube is connected a vertical spindle 23, having at its upper end a handle 24, arranged within convenient reach of the operator, located on a seat 25, and the operator may move the handle to and fro and in this way slightly shift the position of the brush and the suction inlet member, so as to facilitate the cleaning operation.

That end of the pipe 9 which extends within the receiving-tank 7 is provided with a plurality of outlet-tubes, three of such tubes, 26, 27, and 28, being shown in the present instance. At each of these tubes is a gate-valve 29, that is connected to a rod 30, leading upward through the top of the tank, and on the rod is formed a rack with which engages a pinion 31, the pinion being carried by a shaft 32, having a suitable hand-wheel 33. On the rod 30 is a graduated scale in order that the operator may be informed as to the position of the valve.

In starting into operation the valve of the lowermost tube 20 is open, it being understood that the mouth of this tube is immersed in the water. The vehicle is traveled, and the suction of the fan 5 will cause the dust and dirt disturbed by the brush 8 to be sucked up through the tube and discharged through the outlet-tube 26 at a point below the surface of the water, the latter retaining the dirt and dust, while the air escapes to that portion of the tank above water-level and finally passes out through the pipe 5, leading to the pump. The air in leaving the tank passes through the screens 12, so that any dirt or dust which the air may retain will be caught before the air finally escapes to the atmosphere. After being in operation for a short time the accumulated dust or dirt will raise the level of the water until the second of the tubes, 27, is immersed, after which the valve of the tube 26 may be closed and that of the tube 27 opened, this operation being continued until the tank is full and there being as many tubes as necessary. When the screens become clogged with dirt, they are removed from position within the box 10 and placed in the cleaning-box 14, preferably only a single screen being removed each time.

Where the volume of dust-laden air is sucked through the water, the latter is violently agitated, and in some cases there may be a tendency for the air to escape without yielding up its dirt. In order to prevent this, a perforated float 40 is placed on the surface of the water. This float is preferably formed of a circular disk of wood having numerous perforations through which the air may escape, and in its edges are a number of notches 41, receiving guiding-rods or vertical ribs 42, projecting inwardly from the tank, so as to prevent rotative movement of the float. The float is provided with openings to permit it to pass the several discharge-tubes 26, 27, and 28.

In order to reduce the number of openings in the float, the several discharge-tubes 26, 27, and 28 may all be arranged in the same vertical line, as shown in Fig. 7, so that only a single opening would be required on the float to permit the water to pass the tubes.

Having thus described the invention, what is claimed is—

1. The combination with a tank arranged to contain a volume of liquid, of a suction-pipe entering the tank and extending thereinto to a point below the liquid-level, and means for altering the vertical height of the discharge-point of the dust-laden air from said pipe as the quantity of dirt accumulates.

2. In a dust-separator, a liquid-containing tank, a pipe extending thereinto and provided with air and dust discharge nozzles at different levels, and means for opening the successive nozzles as they become sealed by the liquid.

3. In dust-separators, a liquid-containing tank, a discharge-pipe leading thereinto, nozzles extending from the pipe and arranged, respectively, at different vertical heights, and at different points in the circumference of the pipe, and valves in said nozzles, the valves having independent operating-stems extending through the top of the tank.

4. The combination with a liquid-containing tank, of a pipe leading thereinto, discharge-nozzles arranged at different vertical heights in said pipe, a perforated float surrounding the pipe and having openings to permit the passage of the float past the nozzles, and guiding devices carried by the tank and engaging said float.

5. In a pneumatic cleaning apparatus, a dust-receiving tank adapted to contain a volume of water, means for discharging dust-laden air below the surface of the water, a pump, a suction-pipe connecting the pump to the outer portion of the tank, a screening-box between the pipe and fan, and provided with a plurality of ribs, and removable screens supported by the ribs, an outlet-pipe leading from the pump, a screen-cleaning device on the outlet-pipe, and a plurality of ribs carried by the box and adapted for the support of the screens to be cleaned.

In testimony that I claim the foregoing as my own I have hereto affixed my signature in the presence of two witnesses.

HOLMES DUKE.

Witnesses:
J. H. JOCHUM, Jr.,
FRANK S. APPLEMAN.